United States Patent
Abdelaal et al.

(10) Patent No.: US 11,619,603 B2
(45) Date of Patent: Apr. 4, 2023

(54) SENSOR SYSTEM FOR DETECTING OF A PRESENCE AND A PHASE OF A MEDIUM ON A SURFACE AND METHODS OF USING THE SAME

(71) Applicant: The University of Toledo, Toledo, OH (US)

(72) Inventors: Ahmed Abdelaal, Toledo, OH (US); Mehdi Sarayloo, Toledo, OH (US); Douglas K. Nims, Toledo, OH (US); Hossein Sojoudi, Toledo, OH (US)

(73) Assignee: The University of Toledo, Toledo, OH (US)

( * ) Notice: Subject to any disclaimer, the term of this patent is extended or adjusted under 35 U.S.C. 154(b) by 280 days.

(21) Appl. No.: 16/796,356

(22) Filed: Feb. 20, 2020

(65) Prior Publication Data

US 2020/0271603 A1    Aug. 27, 2020

Related U.S. Application Data

(60) Provisional application No. 62/809,863, filed on Feb. 25, 2019.

(51) Int. Cl.
*G01N 27/04* (2006.01)
*G01N 27/06* (2006.01)

(52) U.S. Cl.
CPC ......... *G01N 27/045* (2013.01); *G01N 27/041* (2013.01); *G01N 27/043* (2013.01); *G01N 27/06* (2013.01)

(58) Field of Classification Search
CPC .. G01N 27/041; G01N 27/043; G01N 27/045; G01N 27/06; G01N 27/07
See application file for complete search history.

(56) References Cited

U.S. PATENT DOCUMENTS

| 6,276,202 B1 * | 8/2001 | Latarius | G08B 19/02 73/25.04 |
| 2013/0002271 A1 * | 1/2013 | Hocken | F02D 41/1466 324/705 |

FOREIGN PATENT DOCUMENTS

| CN | 104914316 A | * | 9/2015 | |
| WO | WO-2010142282 A1 | * | 12/2010 | G01N 27/06 |

OTHER PUBLICATIONS

Translation of document WO-2010142282-A1; pp. 1-18 (Year: 2010).*

(Continued)

*Primary Examiner* — Jay Patidar
(74) *Attorney, Agent, or Firm* — MacMillan, Sobanski & Todd, LLC

(57) ABSTRACT

Sensor systems, sensors, and methods for detecting a presence and a phase of a medium on a surface are described. The sensor system has a power source providing a voltage; a sensing element in electrical communication with the power source, the sensing element including: two electrodes, wherein a gap is defined between the two electrodes, and a temperature measurement device disposed between the two electrodes; a fixed resistor in electrical communication with the power source and the sensing element; and a data acquisition system in electrical communication with the power source, the sensing element, and the fixed resistor. The sensor system measures the electrical resistance of the medium, and the temperature of the surface, and identifies the phase of the medium.

16 Claims, 5 Drawing Sheets

(56) References Cited

OTHER PUBLICATIONS

Decagon Devices, Inc., Dielectric Leaf Wetness Sensor, Operator's Manual Version 3, http://ictinternational.com/content/uploads/2014/03/10386_Leaf-Wetness-Sensor_Web.pdf (accessed Oct. 1, 2021).
Knight et al., "The Electrical Conductivity and Crystal Phase Change in d-Camphor", Department of Physics, University of York, 1970, Short Notes, vol. 37, No. 1, pp. K39-K41.
Denoth, "An electronic device for long-term snow wetness recording", Annals of Glaciology, 1994, vol. 19, pp. 104-106.
Li et al., "Electrical Conductivity of Water/Sodium Bis(2-ethylhexyl) Sulfosuccinate/n-Heptane and Water/Sodium Bis(2-ethlhexyl) Phosphate/n-Heptane Systems: The Influences of Water Content, Bis(2-ethlhexyl) Phosphoric Acid, and Temperature", Journal of Colloid and Interface Science, 2001, vol. 239, pp. 522-527.
Xiaoping et al., "Novel method for bulk resistance evaluation in conductivity measurement for high-purity water", Accreditation and Quality Assurance, 2007, vol. 12, No. 7, pp. 351-355.
Ryerson, "Assessment of Superstructure Ice Protection as Applied to Offshore Oil Operations Safety", US Army Research, U.S. Department of Defense, 2009, vol. 49, pp. 1-327.
Ezan et al., "Ice thickness measurement method for thermal energy storage unit", Journal of Thermal Science and Technology, 2011, vol. 31, pp. 1-10.
Nims, "Ice Prevention or Removal on the Veteran's Glass City Skyway Cables", Interim Report, Department of Civil Engineering, University of Toledo, 2011, State Job No. 134489, pp. 1-92.
Nims et al., "Ice Prevention or Removal on the Veteran's Glass City Skyway Cables", Final Report, The Ohio Department of Transportation, Office of Statewide Planning & Research, 2014, State Job No. 134489, pp. 1-316.
Likitkumchorn, "Ice Prevention and Weather Monitoring on Cable-Stayed Bridges" A Thesis, The University of Toledo, 2014, pp. 1-143, Available: http://rave.ohiolink.edu/etdc/view?acc_num=toledo1404393052.
Mirto et al., "Icing Management on the Veterans' Glass City Skyway Stay Cables", Transportation Research Record: Journal of the Transportation Research Board, 2015, No. 2482, pp. 74-81.
Kinar et al., "Measurement of the physical properties of the snowpack", Reviews of Geophysics, 2015, pp. 481-544.
Sarayloo, "A Sensor for Measuring Liquid Water Content of Wet Snow on Superstructures", A Thesis, The University of Toledo, 2019, pp. 1-93.
Abdelaal et al., "A flexible surface-mountable sensor for ice detection and non-destructive measurement of liquid water content in snow", Cold Regions Science and Technology, ELSEVIER, 2022, vol. 195, pp. 1-11.

* cited by examiner

SENSOR SYSTEM FOR DETECTING OF A PRESENCE AND A PHASE OF A MEDIUM ON A SURFACE AND METHODS OF USING THE SAME

CROSS-REFERENCE TO RELATED APPLICATIONS

This application claims the benefit of U.S. Provisional Application Ser. No. 62/809,863 filed Feb. 25, 2019, the entire disclosure of which is expressly incorporated herein by reference.

STATEMENT REGARDING FEDERALLY SPONSORED RESEARCH

The invention was not made with any U.S. Government support, and the United States Government has no rights in the invention.

BACKGROUND OF THE INVENTION

Many commercial applications can utilize a tool to detect the presence of ice, snow, or water on a surface such as residential and automotive air conditioning coils, heat pumps in electric cars, autonomous vehicles, de/anti-icing technologies, as well as structures such as solar panels, bridge cables, wind turbines, and power lines. For example, detecting ice or snow on bridge cables during icing event is crucial for bridge operators in determining the most appropriate action to reduce the hazard to travelers. Likewise, installing the sensor on the evaporator coil of an air conditioner would increase the efficiency of the air conditioner by allowing the temperature of the evaporator coil to decrease and by alarming the user of any ice accumulation inside the unit to prevent the unit's failure.

Wet snow accumulation on infrastructures, like the cables of cable-stay bridges, can be hazardous for travelers. In order to mitigate the risk of shedding, it is essential to identify how wet snow accumulates on a surface and how it shed off. Several variables contribute in shedding phenomenon of which liquid water content is the most important. The liquid water content (LWC) or wetness of snow is defined as the ratio of the weight of water contained to the total weight of the wet snow. Additionally, distinguishing the liquid water content in wet snow will be essential in other applications includes the power line cables and wind turbines, like hydrological and avalanche research.

SUMMARY OF THE INVENTION

The sensor provides in-situ detection of the presence and state of water (i.e. liquid water, snow, frozen water) over the surface of any structure. The sensor also determines the liquid water content (LWC) in wet snow, if it is the medium covering the surface, when the state of frozen water-based matter is wet snow.

The sensor is also useful in detecting whether a given surface is wet or dry.

The sensor is a resistance-based sensor that uses the change of the electrical conductivity of different media (i.e., water, ice, snow, and air) and the surface temperature at the same location to determine the medium that covers the sensing element/surface.

Other systems, methods, features, and advantages of the present invention will be or will become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION

Throughout this disclosure, various publications, patents and published patent specifications are referenced by an identifying citation. The disclosures of these publications, patents and published patent specifications are hereby incorporated by reference into the present disclosure to more fully describe the state of the art to which this invention pertains.

General Description

Figure 1:
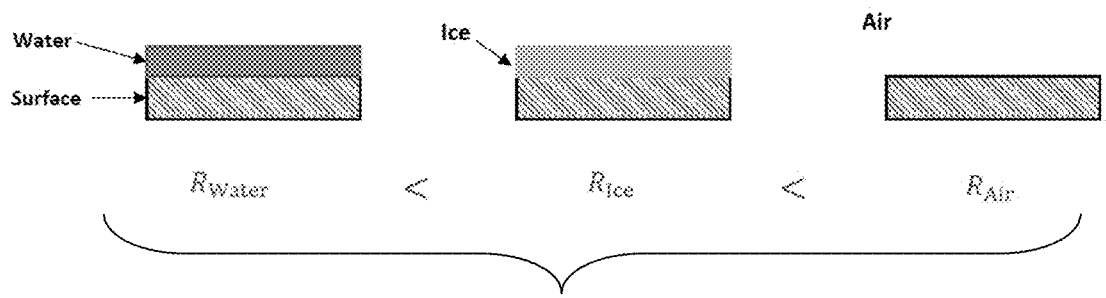
FIG. 1: Comparison between resistance of water, ice, and air when covering a surface.

The present ice/snow/LWC (liquid water content) sensor acts to sense the electrical conductivity that varies through different media, including the same medium, such as water, at different phases. Electrical conductivity is the inverse of electrical resistivity, which is a representation of the current flow through the media between charged electrodes. Three media are taken into consideration: water, frozen matter (ice/snow), and air. When water has no impurities, such pure water can be a good insulator. However, since water is a good solvent, it dissolves impurities, which allows a current to pass through by the movement of the free ions of the dissolvent. In addition, temperature affects ion movement in the medium. As temperature decreases, water freezes and turns into ice, which is purer than the water, as the crystal lattice of ice attempts to keep the structure uniform by ejecting impurities out of the growing ice structure. This leads to the decrease of electrical conductivity of ice as the ions and molecules cannot move easily. In contrast, electrical conductivity of air is low compared to water and ice. The difference between the electrical resistances of these matters is seen schematically in FIG. 1.

Figure 2:
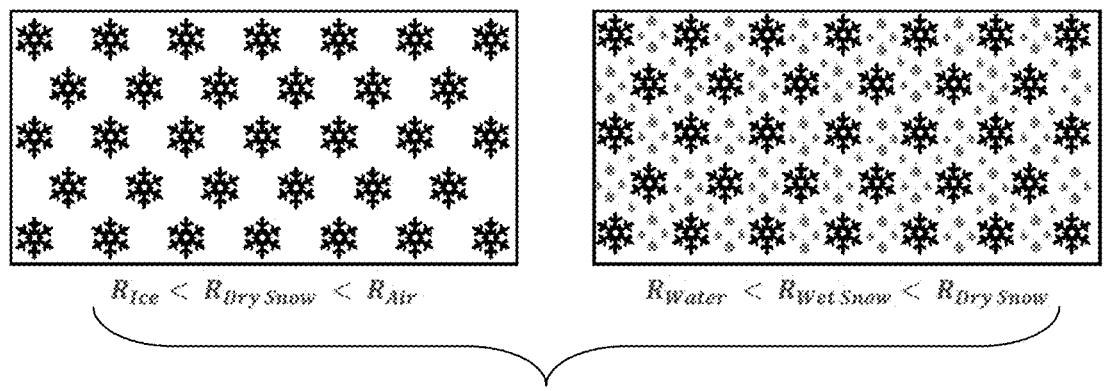
FIG. 2: Comparison between the resistances of different media. Dry Snow (left) has two elements which are air and ice; Wet Snow (right) has three elements which are air, ice, and water.

Snow is a combination of two or three of the media. Dry snow is a combination of air and ice particles; whereas wet snow is a combination of air, ice, and liquid water. Therefore, the resistivity of dry snow will be between the resistivity of air and ice, while the resistivity of wet snow will be between the resistivity of dry snow and water based on the percentage of water in the mixture. This is summarized schematically in FIG. 2.

However, only measuring the electrical resistance is not sufficient to detect the accumulation on the sensor. Therefore, the present sensor combines the electrical resistance and temperature measurements to improve the accuracy and reliability of output data.

Measuring the temperature is important for ice/snow detection functionality as electrical resistance of one medium could overlap with another medium. For instance, dew and snow are two completely different types of accumulation while electrical resistance of these two media could be similar in some special situation. Snow happens in freezing temperatures while dew happens in above zero temperatures. Therefore, if temperature is combined with electrical resistance through an algorithm, these two media are readily differentiated.

Figure 3A:
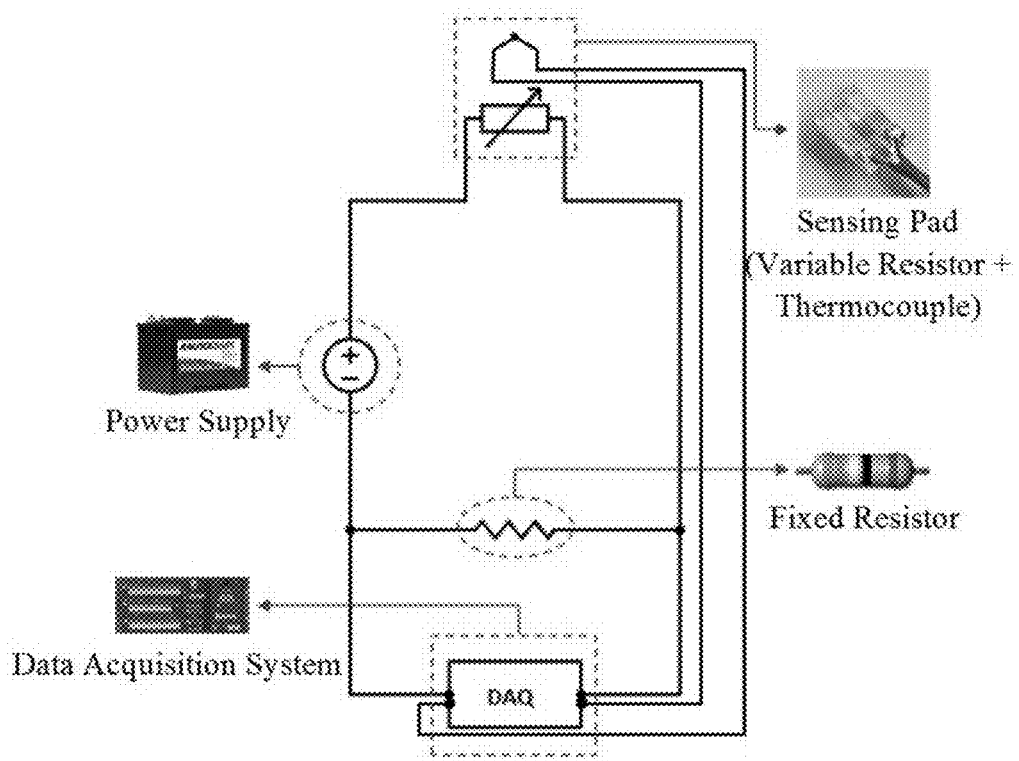
FIG. 3A: Schematic for one embodiment of a sensor for ice/snow detection and liquid water content.

FIG. 3A shows an electrical resistance circuit that includes a power supply that provides the 5000 millivolts input DC voltage ($V_{in}$), a one mega Ohm fixed resistor ($R_f$), the sensor which acts as a variable resistor ($R_v$) and a data acquisition system (DAQ) to read and record the output voltage ($V_{out}$) and temperature. The sensor acts as a variable resistor based on what medium is covering the surface.

Figure 3B:
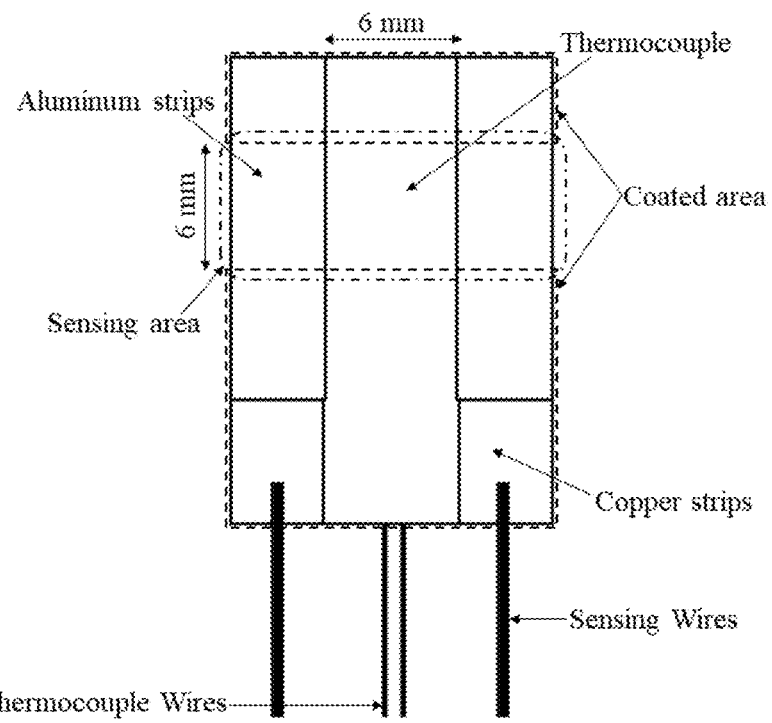
FIG. 3B: Schematic of a sensing pad.
Figure 4:
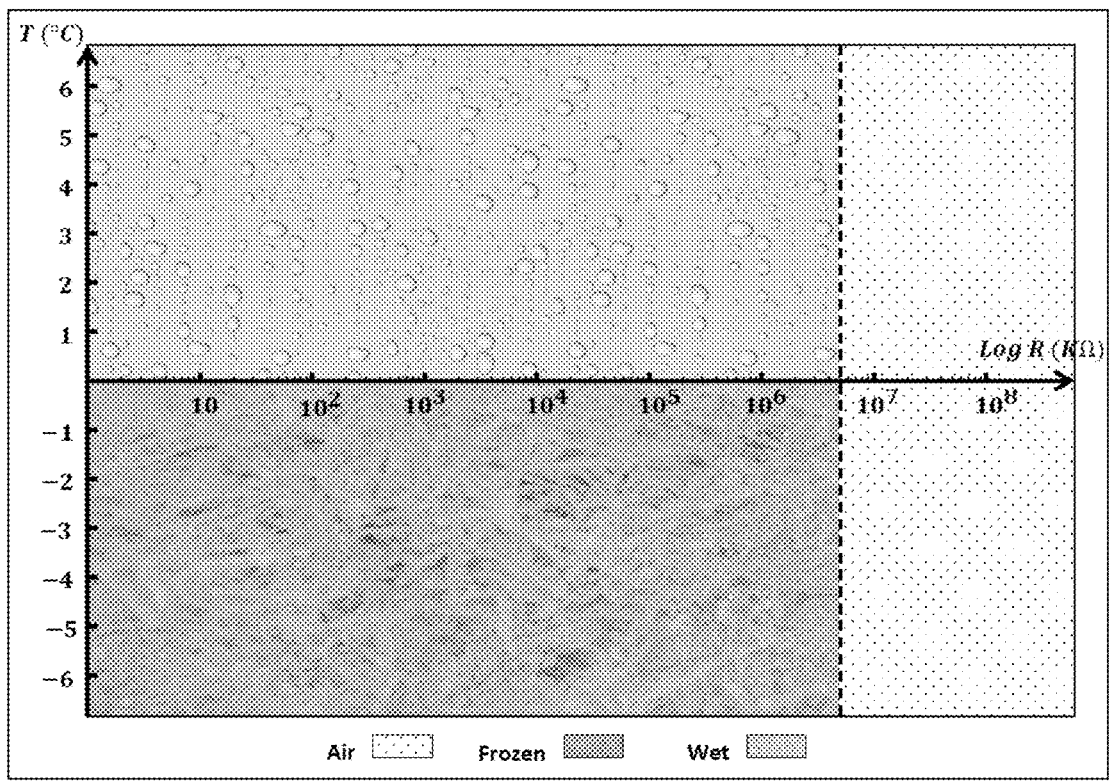
FIG. 4: Map showing different states/medium ranges (wet state, frozen medium state (ice or snow), and dry state (air).

The sensing element is placed over a surface-based temperature measurement pad as depicted in FIG. 3B, and the temperature measurement pad may be made of any surface-based temperature measurement sensor, such as a thermocouple, a thermistor, or a resistance temperature detector (RTD), with two copper strips adhered on the top of the pad. As best seen in FIG. 3B, the sensor includes copper strips with aluminum cover with 6 mm distance as sensing electrodes. The circuit has a different resistor as well as operating voltage.

The copper strips are the sensing electrodes to measure the variable resistance ($R_v$). In certain embodiments, a protective rubber coating can be used to cover the bare copper strips in order to prevent corrosion, while the non-coated copper tape can be covered by conductive aluminum tape. One part has the sensing pad and the other has the resistor and the wires are connected to the DAQ system. All the wires and connected equipment were waterproofed by using the heat shrink tubes and coatings.

The sensor measures the differential voltage between the two electrodes, which are separated by a gap. The medium in the gap performs as a variable resistor.

To control the sensor length and interchangeability, the sensor is divided into two parts, i.e., a sensing element that is to be attached to the surface, which includes the sensing terminal and temperature measurement pad, and a cable part which includes the fixed resistance where it will be connected to the data logger and power supply. In this way, the sensing element can be as close as a few inches or as far as 100 feet from the DAQ connection, enabling a versatile installation of the sensor in various applications.

One useful example of a DAQ system is a Campbell-Scientific CR-1000 that has several channels to connect several sensors simultaneously and has a stable functionality in very low temperatures. It is to be understood, however, that other types of data loggers can be used instead. The DAQ system can be also a less expensive standalone system such as an Arduino.

The DAQ system is coded by an algorithm which uses the electrical resistance and temperature to detect the accumulation state and its liquid water content in case of wet snow. The accumulation state output ranges between three integers (−1, 0, 1), where −1 represents no accumulation or air, 0 represents frozen matter, and 1 represents wet state.

The output voltage depends on the medium that is closing the circuit. By using the Ohm's Law, the following equations are deduced.

In the first equation, the voltage is equal to the current (I) times the total resistance of the circuit. When determining the current in the circuit, the resistance of the entire circuit needs to be considered because all current is being forced to travel over the fixed resistor ($R_f$) as well as the variable resistance ($R_v$). Since the resistors are in series, the total resistance equals to sum of the fixed resistor and the variable resistor (Equation 2). In the following equation, only fixed resistor needs to be considered due to how the DAQ system is tied into the circuit. Since the DAQ is only reading over one resistance and the current cannot change, the output voltage varies. Since the current is the same all over the circuit, the fractions in equation 1 and 3 are equal (Equation 4).

$$V_{in} = IR_T \qquad (1)$$
$$I = \frac{V_{in}}{R_T}$$

$$R_T = R_f + R_v \qquad (2)$$

$$V_{out} = IR_f \qquad (3)$$
$$I = \frac{V_{out}}{R_f}$$

$$\frac{V_{out}}{R_f} = \frac{V_{in}}{R_f + R_v} \qquad (4)$$

The fixed resistor and the input voltage are known. The output voltage is measured by DAQ system. By using above equations, the variable resistance is calculated as follows:

$$R_v = \frac{V_{in} * R_f}{V_{out}} - R_f \qquad (5)$$

EXAMPLES

The present invention is further defined in the following Examples, in which all parts and percentages are by weight and degrees are Celsius, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions. All publications, including patents and non-patent literature, referred to in this specification are expressly incorporated by reference. The following examples are intended to illustrate certain preferred embodiments of the invention and should not be interpreted to limit the scope of the invention as defined in the claims, unless so specified.

Several experiments by using two different snow producing methods were conducted. Introducing the liquid water to a dry snow considerably decreases the electrical resistance with respect to the ratio of water to snow.

Figure 5A:
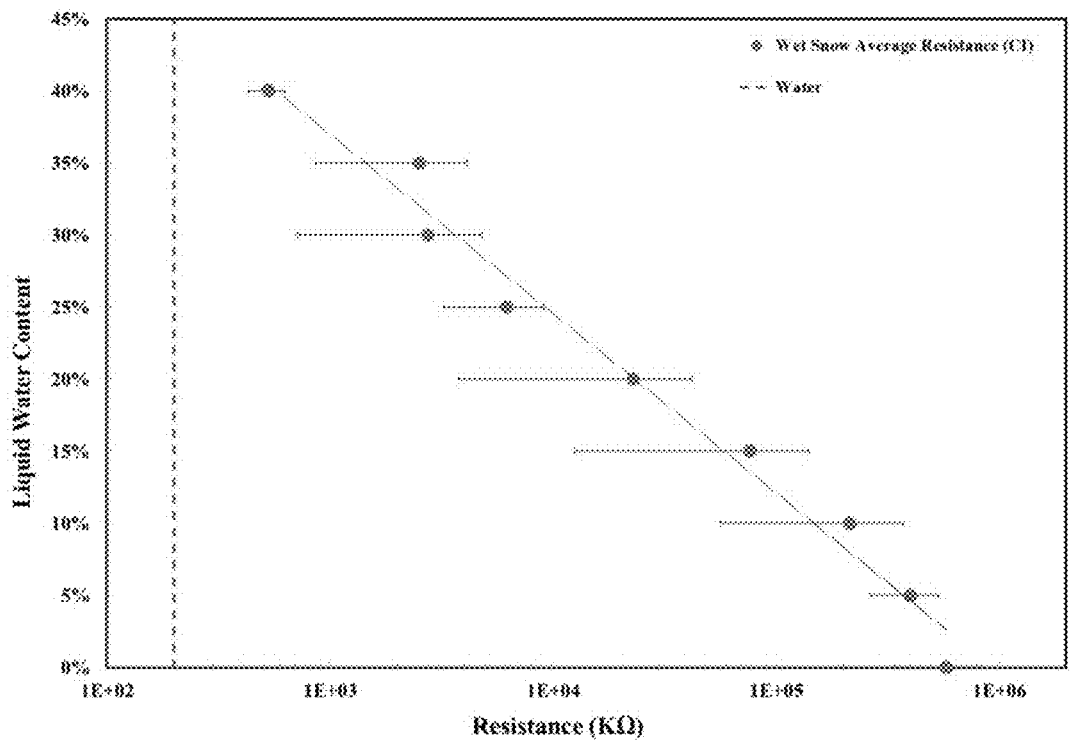
FIGS. 5A-5B: Average electrical resistance plot for experiments with artificially created snow (FIG. 5A) and experiments with a mixture of snow and frozen water (FIG. 5B).
Figure 5B:
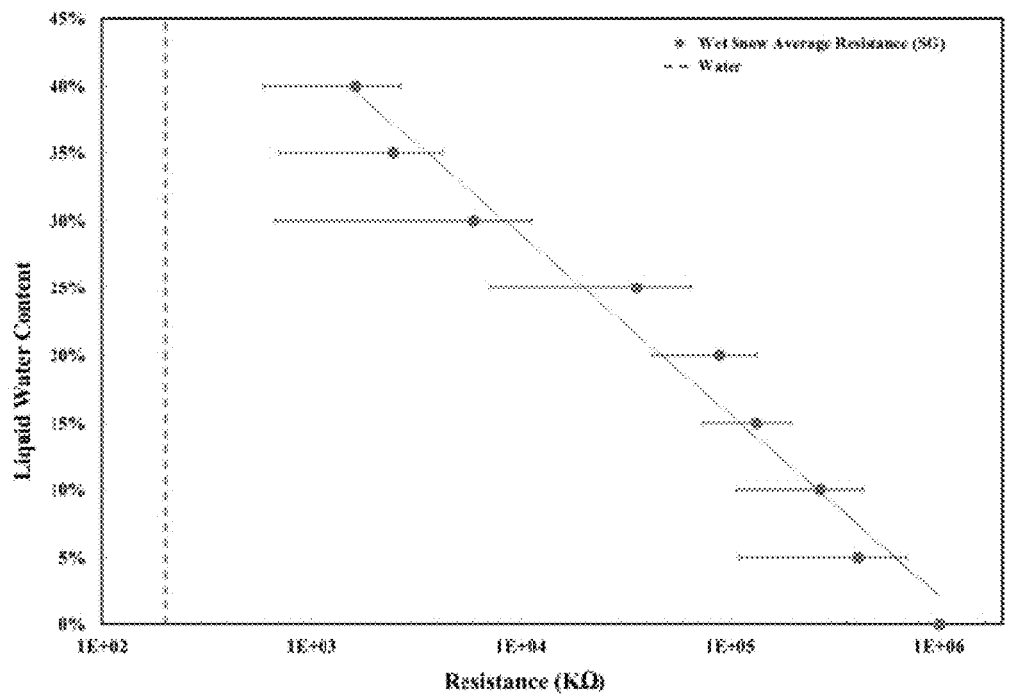

Initially, experiments were conducted to measure the resistance of the different media and to create upper and lower limits between wet state, frozen medium state (ice or snow), and dry state (air). Based on these results, a map was developed so that the three states could be differentiated based on the resistance measured (derived from the differential voltage) as presented in FIGS. 5A-5B.

Results

To complete the map for the snow medium, the experiments were conducted in a freezing room where different snow samples with different liquid water contents (LWCs) were placed on a Petri dish. The LWC ranged from 0%, which is dry snow, to 40%, which is very wet snow (40% of the total weight is liquid water and 60% is ice particles).

Figure 6:
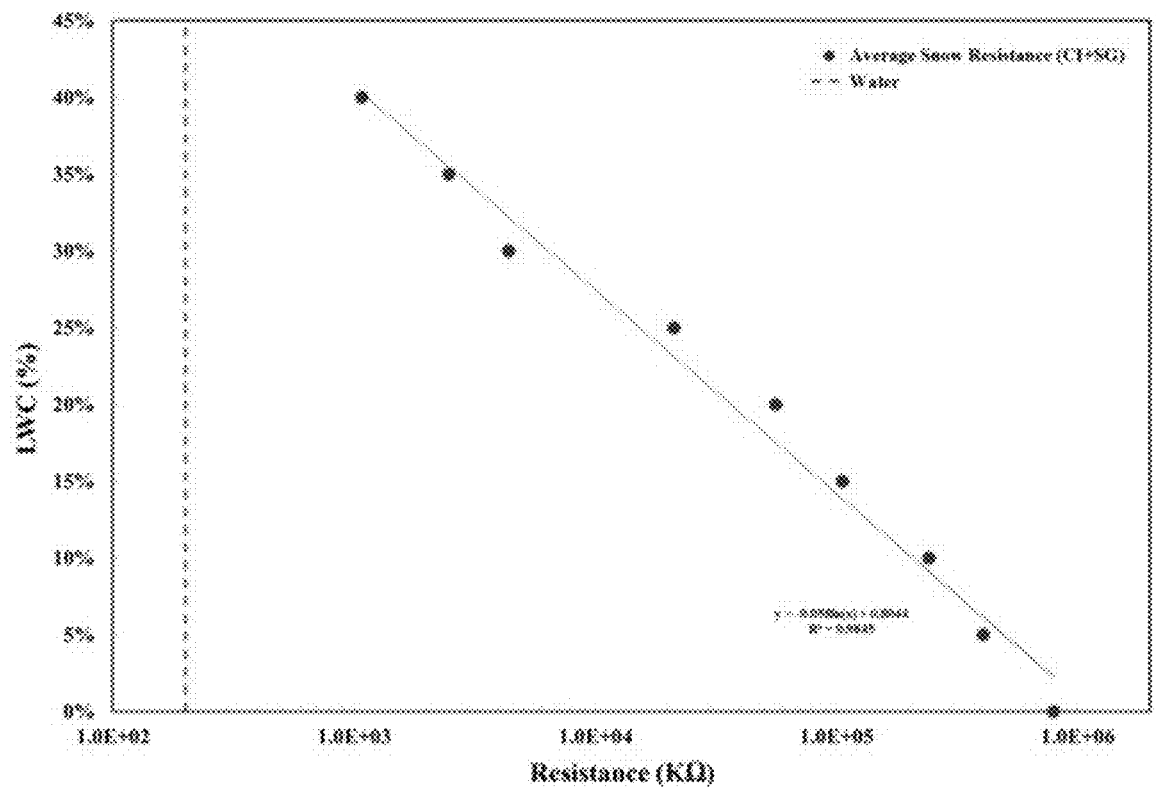
FIG. 6: General Snow resistance plot.

The experiments established a general relationship that represents the liquid water Content of wet snow which is vital in level of wetness and adhesion strength of the snow to various surfaces. The adhesion strength directly impacts the potential shedding/sliding of the wet snow on a given surface, due to various natural phenomena such as rise in temperature, wind, and gravity. FIG. 6 shows the average results from the experiments and the general empirical function obtained from these experiments.

The electrical resistance of wet snow diminishes by increasing the LWC. Having more liquid water between the ice granules means more free ions which allow the current to pass easier through the snow. The electrical resistance started from $2.6 \times 10^5$ KΩ for 5% LWC and decreased to $5.8 \times 10^2$ KΩ for 40% LWC.

Several sets of these experiments were conducted, and each included LWC from 5% to 40%. To better understand how electrical resistance of snow varies by changing the LWC, average values with error bars for each level of LWC are plotted and shown in FIGS. 5A-5B.

Each point represents the average electrical resistance for a specific LWC level. By using a logarithmic scale for the electrical resistance axis, it is easier to show the governing pattern of changes.

Accordingly, a General plot was drawn by using these two plots (FIG. 6) and snow liquid water content can be fitted with an exponential function. Since the physical properties of two wet snow types used in experiments were different, like the real snow, it is reasonable to use the extracted equation for other types of snow. Finally, an algorithm was written to differentiate three possible accumulation states which are air, frozen state, and wet state. The liquid water content detection was also embedded in this algorithm to show the LWC while there is snow accumulation.

Verification of Liquid Water Content (LWC) Measurements

Figure 7:
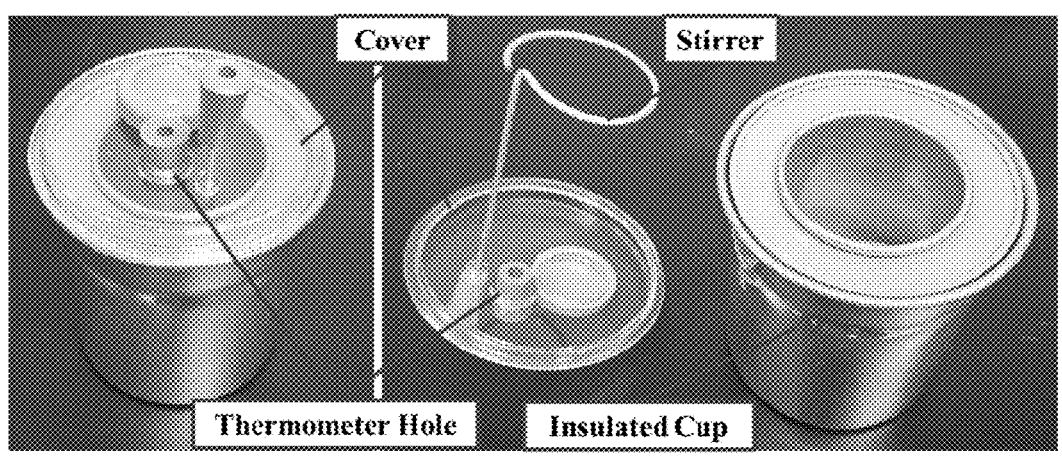
FIG. 7: Illustration of calorimeter device setup.

To verify the sensor measurements, another method was used to estimate the LWC of different wet snows. Melting calorimetry, which is also known as an Endo-type snow water content meter, was chosen for its quickness and dependably. The schematic diagram of the melting calorimeter is depicted in FIG. 7.

All the tests were conducted in the cold room. The snow was sifted on a flat HDPE plate with a sensor on the middle until the snow reached a 3-inch uniform accumulation. The cold room temperature was then increased to 1° C. The sensor measures the LWC and as it increased slowly, 10 samples were taken using a small tube for the calorimeter.

The measuring of LWC procedures by the melting calorimeter are as follows:

(1) 60-100 cm$^3$ of hot water (30-40° C.) are put into a small vessel and its mass, M1, is measured;

(2) the vessel is emptied of hot water by pouring it into the container of the device and then the mass of the empty vessel, M2, is measured;

(3) after the lid is put on the container, the total mass of the device, including the hot water, M3, is measured;

(4) the temperature of the hot water, T1, is read on the thermometer while stirring the device;

(5) soon after the snow is taken with a sampler, the lid is taken off for an instant and then the sample (20-30 g) is put into the container. The snow sample is quickly melted by using the device's stirrer, resulting in a rapid drop in temperature of the hot water. When the thermometer registers a stable temperature, T2, it is measured by the observer.

(6) the total mass of the device, including hot water and snow sample, M4, is measured.

The LWC is defined as the ratio of the water weight to the total weight of wet snow in percent, and is calculated (Equation 6):

$$LWC = 100\left[1 - \frac{C}{L}\left\{\frac{(M_1 - M_2)(T_1 - T_2)}{M_4 - M_3} - T_2\right\}\right] \quad (6)$$

where C is the specific heat of the water ($4.2 \times 10^3$ J kg−1 K−1) and L is the latent heat of fusion of the ice ($3.34 \times 10^5$ J kg−1). M1, M2, M3 and M4 are determined with an accuracy of 10-4 kg and T1 and T2 in Celsius with an accuracy of 0.1° C.

Figure 8:
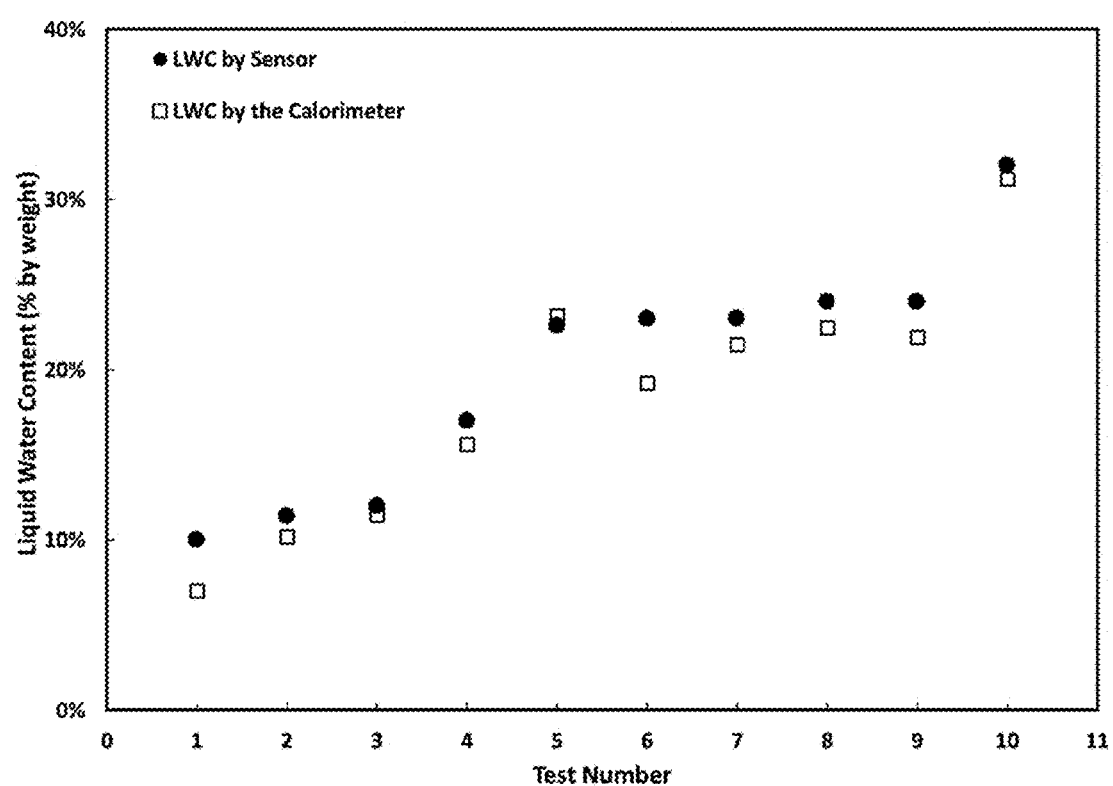
FIG. 8: Liquid water content measured by melting calorimeter method in comparison with those by the sensor.

FIG. 8 shows the relationship between the measured value by the sensor method and that by the calorimeter method. Sensor results were a little higher than the calorimeter in most of the cases. The maximum difference was about 3.8% and the average was 1.5% and shows an acceptable correlation between the results.

Examples of Uses

The sensor is flat, small, and flexible which enables the sensor to be installed on any curved surfaces such as cable stays on bridges, while monitoring the temperature.

The sensor provides a surface-based and in-situ point sensor that can be installed on any surfaces, for providing real time measurements without a need to an operator.

In comparison to other available technologies, the sensor cost is much lower which enables potential customers in a wide range of industries to obtain for performing measurements at multiple locations. Due to its small size and flexibility, the sensor can be installed on any surface instead of simply relying on atmospheric conditions and weather data for the state and conditions of accumulated precipitation.

The sensor is useful in detecting the Liquid Water Content of wet snow on surfaces without affecting the properties of the snow on the surface during measurement.

The sensor is useful for snow pack as well as any thin layer of accumulated snow.

The sensor is useful in small applications, such as residential air conditioning evaporator coils; in bigger applications, such as bridges and telecommunication towers; and, in critical application, such as aerospace.

Other applications include de/anti icing technologies that require a real-time controlling tool to help improving the efficiencies of their systems.

In addition, the sensor is also beneficial to other applications related to automotive and autonomous vehicles.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

What is claimed is:

1. A sensor system for detecting a presence and a phase of a medium on a surface, the sensor system comprising:
   a power source providing a voltage;
   a sensing element in electrical communication with the power source, the sensing element comprising:
      a temperature measurement pad configured to be mounted to the surface and measure a temperature at the surface, and
      two electrodes disposed on a side of the temperature measurement pad opposing the surface, each of the two electrodes including a first coated area, a second coated area, and an intermediate area disposed between the first coated area and the second coated area, wherein the intermediate area is covered by a conductive tape, a gap is defined between the intermediate area of each of the two electrodes, and the gap is configured to receive the medium;
   a fixed resistor in electrical communication with the power source and the sensing element; and
   a data acquisition system in electrical communication with the power source, the sensing element, and the fixed resistor, the data acquisition system being configured to measure a differential voltage between the two electrodes, record the temperature at the surface, determine a resistance of the medium using the differential voltage, the fixed resistor, and the voltage of the power source, and determine the phase of the medium based on the resistance of the medium and the temperature at the surface.

2. The sensor system of claim 1, wherein the fixed resistor has a resistance of one mega Ohm.

3. The sensor system of claim 1, wherein the gap is 6 mm.

4. The sensor system of claim 1, wherein the temperature measurement pad comprises a thermocouple, a thermistor, or a resistance temperature detector.

5. The sensor system of claim 1, wherein the data acquisition system is configured to determine a liquid water content in the medium using the resistance of the medium and the temperature.

6. The sensor system of claim 1, wherein the medium is water, ice, snow, or air.

7. A method for detecting a presence and a phase of a medium on a surface, the method comprising:
   mounting the temperature measurement pad of the sensor system of claim 1 to the surface;
   determining the resistance of the medium;
   determining the temperature at the surface;
   determining the phase of the medium based on the resistance of the medium and the temperature at the surface; and
   determining a liquid water content in the medium based on the resistance of the medium and the temperature at the surface.

8. The method of claim 7, wherein the medium is water, ice, snow, or air.

9. The method of claim 7, wherein the medium is snow, and the liquid water content is determined without affecting a physical property of the snow.

10. The method of claim 7, wherein the fixed resistor has a resistance of one mega Ohm.

11. The method of claim 7, wherein the gap is 6 mm.

12. The method of claim 7, wherein the voltage of the power source is a direct current voltage.

13. The sensor system of claim 1, wherein the voltage of the power source is a direct current voltage.

14. The method of claim 7, wherein the temperature measurement pad comprises a thermocouple, a thermistor, or a resistance temperature detector.

15. A sensor system for detecting a presence and a phase of a medium on a surface, the sensor system comprising:
   a power source providing a voltage;
   a sensing element in electrical communication with the power source, the sensing element comprising:
      a temperature measurement pad configured to be mounted to the surface and measure a temperature at the surface, and
      two electrodes disposed on a side of the temperature measurement pad opposing the surface, each of the two electrodes including a first coated area, a second coated area, and an intermediate area disposed between the first coated area and the second coated area, wherein the intermediate area is covered by a conductive tape, a gap is defined between the intermediate area of each of the two electrodes, and the gap is configured to receive the medium;
   a fixed resistor in electrical communication with the sensing element and the power source, the fixed resistor having a resistance of one mega Ohm; and
   a data acquisition system in electrical communication with the power source, the sensing element, and the fixed resistor, the data acquisition system being configured to measure a differential voltage between the two electrodes, record the temperature at the surface, determine a resistance of the medium using the differential voltage, the fixed resistor, and the voltage of the power source, and determine the phase of the medium based on the resistance of the medium and the temperature at the surface.

16. A sensor system for detecting a presence and a phase of a medium on a surface, the sensor system comprising:
   a power source providing a direct current voltage;
   a sensing element in electrical communication with the power source, the sensing element comprising:
      a temperature measurement pad configured to be mounted to the surface and measure a temperature at the surface, and
      two electrodes disposed on a side of the temperature measurement pad opposing the surface, each of the two electrodes including a first coated area, a second coated area, and an intermediate area disposed between the first coated area and the second coated area, wherein the intermediate area is covered by a conductive tape, a gap is defined between the intermediate area of each of the two electrodes, the gap is configured to receive the medium, and the gap is 6 mm;
   a fixed resistor in electrical communication with the power source and the sensing element, the fixed resistor having a resistance of one mega Ohm; and
   a data acquisition system in electrical communication with the power source, the sensing element, and the fixed resistor, the data acquisition system being configured to measure a differential voltage between the two electrodes, record the temperature at the surface, determine a resistance of the medium using the differential voltage, the fixed resistor, and the direct current voltage of the power source, and determine the phase of the medium and a liquid water content in the medium based on the resistance of the medium and the temperature at the surface.

\* \* \* \* \*